2,946,649

TANNING AGENT

Rudi Heyden, Dusseldorf, Germany, and Friedrich Schmitt, deceased, late of Dusseldorf, Germany, by Alice Schmitt, née Neukirchner, Dusseldorf, Germany, heir, assignors to Boehme Fettchemie G.m.b.H., Dusseldorf, Germany No Drawing. Filed July 20, 1956, Ser. No. 599,031

Claims priority, application Germany Feb. 24, 1951

4 Claims. (Cl. 8—94.33)

This is a continuation-in-part of U.S. application, filed January 22, 1952, under Ser. No. 267,684, now abandoned.

The present invention relates to a tanning agent.

It has been discovered that polyalkyl ether derivatives of higher molecular organic sulfamide compounds are very satisfactory substances to be used as tanning agents.

The invention is based on our discovery that polyalkyl-ether derivatives of higher molecular organic sulfamide compounds as described hereafter are especially effective tanning agents. This is due to the fact that the molecule of the organic sulfamides of said agents comprise a higher molecular fat-like residue which imparts a special soft and full touch to leather treated with the same.

The new tanning agents exhibit a high affinity to the animal collagen fiber and are capable of being worked into the skins or hides, to which they are well compatible. They may be readily combined with the customary mineral, vegetable, or synthetic tanning agents, or they may be combined with tanning agents used in oil tanning. By varying the length of the hydrocarbon radical and the length of the polyalkyl ether residue, the properties of the new tanning agent may be modified in various respects. Thus, with increasing chain length of the hydrocarbon, the tanning agent assumes the character of an agent used in oil tanning.

The new tanning agents are suitable for tanning animal hides and furs of all kinds, more particularly of calves, sheep, goats, deer, does, or of the hides of large animals. In preparation, the hides are dressed in the usual way by soaking in water, liming and/or chalk-liming, deliming and, if necessary, pickling.

The polyalkyl ether derivatives of higher molecular organic sulfamide compounds are obtained, in a manner known per se, by reacting the sulfamide compounds with alkylene oxides, for instance with ethylene oxide, the length of the alkylene chain in the alkylene oxide being determined by the relative amounts of the starting materials.

Among the sulfamides to be used are: higher molecular organic sulfamides of the aliphatic, cyclo-aliphatic and aromatic series, the aromatic and mixed aliphatic-aromatic sulfamides being of particular technical interest.

Examples for suitable sulfamides are: dodecyl sulfamide, octadenyl sulfamide, octadecenyl sulfamide, mixtures of higher molecular aliphatic sulfamides, as they are for instance obtained by reaction of sulfurdioxide and chlorine with a hydrocarbon mixture having a chain length of $C_{12}$–$C_{22}$ and subsequent amidizing of the sulfochlorides thus obtained; furthermore, alkyl-cyclohexyl sulfamides, naphthalenemono-and-polysulfamides, alkylnaphthalene sulfamides, alkylbenzene sulfamides, as for instance butyl-, hexyl-, octyl-, dodecyl-, octadecyl benzene sulfamides, and the like.

The hydrocarbon residues of the sulfamides may also be interrupted by oxygen, sulfur, or nitrogen, or by atom groups containing oxygen, sulfur, or nitrogen, or they may have substituents in the molecule.

From these sulfamides, the polyalkyl ether derivatives are obtained by addition of alkylene oxides; thus, addition products of 8 to 12 mols ethylene oxide to dodecylbenzene sulfamide or hexadecylbenzene sulfamide, addition products of 6–18 mols ethylene oxide to naphthalene di- or trisulfamide, or to alkylated naphthalene sulfamides, addition products of 6–12 mols propylene oxide to dodecyl sulfamide or octadecenyl sulfamide, or the like.

These addition products have an oily to pasty consistency, are water-soluble or dispersible in water, and are generally used in a pH-range of 2–9. They are kneaded into the skins preferably dissolved in aqueous solution, and in as concentrated a form as possible, in amounts of about 1–8%, calculated with respect to the weight of the skins.

As mentioned before, this tanning procedure may be combined with any other known tanning method; it may be used optionally as a preparatory operation, or as a subsequent operation.

The new tanning agents may, moreover, be used simultaneously with the known tanning agents. It is particularly advantageous to combine the new tanning agents with mineral salts, for instance with chromium salts. However, any other known tanning process can be combined with the new tanning agents. Among these known processes are: tanning with alum, with formaldehyde, with vegetable and/or synthetic tanning agents, etc.

As mentioned before, tanning agents used in oil tanning are likewise suitable for combination with the new tanning agents, for instance fish oils or sulfonates of fatty alcohols.

The invention will now be illustrated by a number of examples, but it should be understood that these are given by way of illustration and not of limitation, and that many modifications of the amounts and substances mentioned can be made without departing from the spirit of the invention.

*Example 1*

Into a delimed cow hide having a pH value of 8 at its surface, 3% of the weight of said hide of an addition product, comprising 8 mols of ethylene oxide and dodecylbenzene sulfamide, are milled in the course of 2–3 hours. Thereafter, 1% of formic acid, in a 10% aqueous solution, is added to the liquor and the milling is continued for another 1–2 hours. Now, 0.5% chromium oxide are added in the form of a chrome-tanning extract (for instance 33% basic commercial chromic tanning salt in 10% solution) and the milling continued for 2 or 3 more hours. After the tanning process is terminated, the leather is beaten over the block in moist condition for 4–7 days. Subsequently, neutralization is carried out with 200% water and 1–2% sodium bicarbonate at 30° C. in a period ranging from 1–2 hours. After rinsing, dyeing and greasing is carried out as usual. Leather for uppers with a full and supple touch is obtained by this method.

In a similar way, pickled split cow hides may be treated. The leather is well neutralized throughout and subsequently dyed and oiled, and a product of a full touch and a short fiber is obtained which resembles velour leather. Instead of the addition product of dodecylbenzene sulfamide-ethylene oxide, another addition product may be used containing 10 mols of ethylene oxide added to octadecylbenzene sulfamide.

*Example 2*

Delimed sheepskins are pretanned with 2% formaline (calculated on the weight of the skins) and 500% water, with the addition of 1–1.5% of sodiumcarbonate; subsequently, 1.5% of ammoniumsulfate are added. After the skins were allowed to drip off, 3% of the tanning agent described in Example 1 are milled into the skins within 2-3 hours, whereupon the tanning procedure is carried through as described in Example 1. The leather thus obtained is of full and supple touch, very durable, and useful in the manufacture of briefcases and the like.

*Example 3*

Into a delimed deerhide free of grains, 4-6% of fish oil (calculated on the weight of the skin) are milled within 2-4 hours at a temperature of 30° C.; to the fish oil 3% (likewise calculated on the skin weight) of the tanning agent, described in Example 1 and emulsified in an aqueous liquor, are added, before the milling operation is started. After the treatment, the skins are stored in a moist state for 4-8 days at 30-35° C. The excessive fat is subsequently washed out and the following treatment carried out as in the manufacture of chamois leather. The leather obtained is chamois-like in character and may be used, for instance, for making wearing apparel.

*Example 4*

Sheepskins are pretanned with 2% formaldehyde as described in Example 2. After draining they are after-tanned with 4% of the addition product consisting of butyl naphthalene disulfamide and 10 mol ethylene oxide. Then 1% formic acid is added and the hides are milled for 1-2 hours. Leathers of a very full touch are obtained if the after-tanning is repeated with a commercial chrome-tanning salt, containing about 0.5% $Cr_2O_3$. After the process is finished the leathers are beaten over the block in moist condition for some days, then neutralized, coloured and greased.

*Example 5*

4% of the water-soluble reaction product obtained by reacting naphthalene disulfochloride with about 1.2% ammonia and adding to 1 mol of the resin-like reaction product 5 mol ethylene oxide dissolved in 100% water are milled in delimed, pickled, hide splits for one hour. Then they are after-tanned with 5% chrome oxide in the form of a commercial chrome tanning salt.

After colouring and greasing a smooth leather is obtained showing a high tensile strength.

*Example 6*

3% of the water-soluble condensation product of 1 mol alkyl benzene disulfamide (alkyl radicals $C_{12}$-$C_{16}$) and 6 mol ethylene oxide and 4-6% cod oil are milled as described in Example 3 in delimed reindeer hides free from grains. After the usual finishing a smooth leather chamois-like character is obtained.

In the examples the percent statements relate to the amounts by weight of the hides to be tanned.

What we claim is:

1. A process for tanning skins, hides and furs into leather, which comprises milling into these materials from 1 to 8 percent of the polyalkyl ether condensation product obtained by the condensation of from 6 to 18 mols ethylene oxide with one mol of an alkylated sulfamide selected from the group consisting of alkylated benzene sulfamides and alkylated naphthalene sulfamides, the alkyl radical being selected from the group consisting of butyl, hexyl, octyl, dodecyl and octadecyl radicals, adjusting the pH range during milling to 2 to 9, until tanning occurs, and washing the excess tanning agent from the leather after tanning is complete.

2. A tanning process wherein skins, hides and furs are subjected to the treatment set forth in claim 1 before being subjected to tanning methods, using vegetable, animal and synthetic tanning agents.

3. A tanning process wherein skins, hides and furs are subjected to the treatment set forth in claim 1 simultaneously with vegetable, mineral and synthetic tanning agents, until tanning occurs.

4. The tanning process according to claim 1, wherein milling takes place in the presence of chromium salts.

References Cited in the file of this patent

UNITED STATES PATENTS

| | | |
|---|---|---|
| 2,040,212 | Orthner et al. | May 12, 1936 |
| 2,345,121 | Hentrich | Mar. 28, 1944 |
| 2,555,684 | De Castro | June 5, 1951 |

FOREIGN PATENTS

| | | |
|---|---|---|
| 380,851 | Great Britain | Sept. 12, 1932 |